US012005601B2

(12) United States Patent
Gallucci

(10) Patent No.: US 12,005,601 B2
(45) Date of Patent: Jun. 11, 2024

(54) METHOD FOR REALISING ARTICLES HAVING A PREDETERMINED AREA AND AESTHETIC APPEARANCE

(71) Applicant: Giuseppe Gallucci, Monte Urano (IT)

(72) Inventor: Giuseppe Gallucci, Monte Urano (IT)

( * ) Notice: Subject to any disclaimer, the term of this patent is extended or adjusted under 35 U.S.C. 154(b) by 0 days.

(21) Appl. No.: 18/117,781

(22) Filed: Mar. 6, 2023

(65) Prior Publication Data

US 2023/0294319 A1 Sep. 21, 2023

(30) Foreign Application Priority Data

Mar. 18, 2022 (IT) ........................ 102022000005312

(51) Int. Cl.

| | |
|---|---|
| ***B26D 7/01*** | (2006.01) |
| ***B26D 5/02*** | (2006.01) |
| ***B26D 9/00*** | (2006.01) |
| ***B26F 1/04*** | (2006.01) |
| ***D05B 39/00*** | (2006.01) |
| *B26D 5/00* | (2006.01) |

(52) U.S. Cl.
CPC ............... *B26D 7/015* (2013.01); *B26D 5/02* (2013.01); *B26D 9/00* (2013.01); *B26F 1/04* (2013.01); *D05B 39/00* (2013.01); *B26D 2005/002* (2013.01)

(58) Field of Classification Search
CPC . B26D 7/015; B26D 5/02; B26D 9/00; B26D 2005/002; B26F 1/04; D05B 39/00
See application file for complete search history.

(56) References Cited

FOREIGN PATENT DOCUMENTS

| | | | | |
|---|---|---|---|---|
| DE | 202019001572 U1 | 6/2019 | | |
| JP | 5730260 B2 * | 6/2015 | ............... | B26D 5/02 |
| WO | WO 94/21852 A1 | 9/1994 | | |

* cited by examiner

*Primary Examiner* — Rick K Chang
(74) *Attorney, Agent, or Firm* — Endurance Law Group PLC

(57) ABSTRACT

A method for realizing articles having a predetermined area and aesthetic appearance uses frames to each of which a portion of material having a prevalent flat extension can be removably hooked. The method includes stitching or punching operations and cutting operations implemented on each portion of material in a first station, a second station and a third station sequentially. Cutting operations are executed on a first portion of material hooked to a first frame in a third station, while stitching or punching operations are carried out on a second portion of material hooked to a second frame and punching or stitching operations are performed on a third portion hooked to a third frame situated in the first station in phased relation.

1 Claim, 7 Drawing Sheets

METHOD FOR REALISING ARTICLES HAVING A PREDETERMINED AREA AND AESTHETIC APPEARANCE

BACKGROUND OF THE INVENTION

It is known that in some sectors (i.e. motor vehicles) use is made of materials having a prevalent flat extension, for example natural and/or synthetic fabrics, natural or synthetic leathers, layered combinations, etc., on which work is done using punching operations, stitching operations and lastly cutting operations so as to obtain articles having a predetermined area and aesthetic extension.

Each of these articles has a particular aesthetic appearance defined by the design that results from the type of punching, stitching and by the mutual arrangement of the above, all connected with the positioning of the punching-stitching ensemble with respect to the edge of the article.

It is advantageous to respect the same references when carrying out the above processing operations, so as to achieve the predetermined outcomes i.e. both the profile of the article and the aesthetic appearance thereof.

Apparatuses are known which use a first machine for realising the punching operations on a portion of material having a greater area than that of the article that it is desired to obtain.

The above-mentioned portion is disengaged from the first machine, and arranged on a second machine which performs the stitching; it is necessary for the operator to respect the same references with which the punching operations have been carried out, so as to carry out the stitching operation according to the predetermined positionings with respect to the punching operations.

Lastly, the above-mentioned portion is disengaged from the second machine in order to be positioned in a third machine comprising a cutting head; in this case too the operator must arrange the portion of material, with respect to the work plane of the cutting head, so as to respect the preceding above-mentioned references.

With the cutting of the portion the article is obtained with a predetermined area (due to the cut) and a predetermined aesthetic appearance, consequent to the combination of the punching and stitching performed on the border of the area of the article.

Apparatuses exist in which the punching-stitching operations are performed in a single machine comprising two operating heads, respectively for the punching and stitching.

DESCRIPTION OF THE PRIOR ART

Known apparatuses are described which first realise the stitching (with a machine) and then the punching (with a further machine) on the portion of material.

DE 202019001572 discloses a method for realising articles having a predetermined area and aesthetic appearance, which includes using frames to each of which a portion of material can be removably hooked having a prevalent flat extension, which comprises, in order, following steps:

- hooking a first portion of the material to a first frame;
- carrying out, on the first portion hooked to the first frame, punching operations; and sewing operations;
- disengaging the article, and relative scrap, from the first frame.

The constructional complications are clear with regard to the technical solutions that actuate the known systems and/or methods and the consequent and concomitant costs.

SUMMARY OF THE INVENTION

The aim of the invention is to provide a method for realising articles having a predetermined area and aesthetic appearance, by means of punching, stitching and cutting operations, actuated in succession, which enable reducing the costs with respect to what is obtained in the prior art.

A further aim of the invention is to describe an apparatus for realising articles having a predetermined area and aesthetic appearance, by means of stitching and punching operations, carried out using operating means activated in a mutual phase relation, and by a successive cutting operation carried out by further operating means, subsequently activated by means of punching-stitching operations, all aimed at reducing costs with respect to those of the prior art systems.

The above-mentioned advantages of the invention are attained according to the contents of the claims.

DESCRIPTION OF THE DRAWINGS

The characteristics of the invention are evident from the description of a preferred embodiment, in which.

DESCRIPTION OF THE PREFERRED EMBODIMENTS

Figure 1:
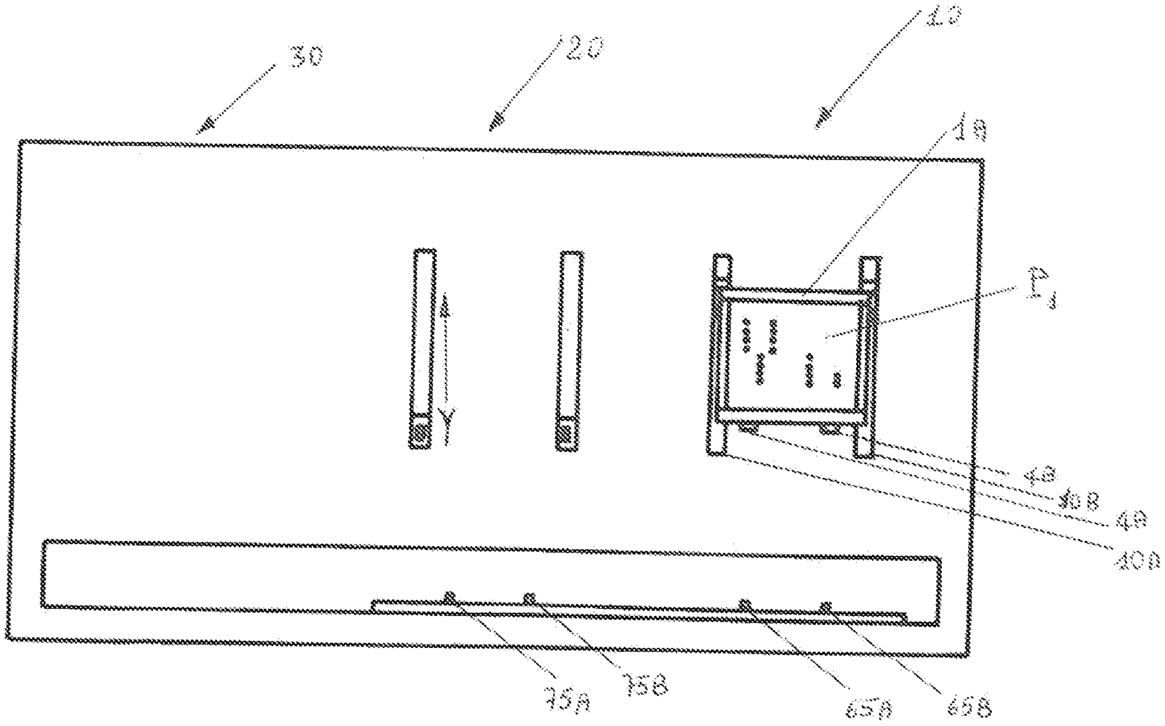
FIGS. 1-10 schematically illustrate, in plan view, with known parts that are not illustrated, an apparatus which actuates the described method, with some technical-functional aspects highlighted that relate to the obtaining of articles having a predetermined area and aesthetic appearance.

With reference to FIGS. 1A, 1B, 1C), three frames are denoted, respectively first, second and third (each of which has a rectangular shape) to each of which, in accordance with techniques known to the expert in the sector, a portion (P1, P2, P3) of material is removably blocked (respectively first, second, third), having a flat extension, the material being made for example of natural and/or synthetic fabrics, natural or synthetic leathers, layered combinations, etc.

The frame comprises, on one side, sliding means (3A, 3B), of known type, and on the other side first coupling means (4A, 4B) of known type.

Again with reference to the figures, "M" denotes in its entirety the apparatus of the present invention.

This apparatus comprises a work plane (5) on which three work stations are realised, precisely: a first station (10), a second station (20), flanked to the first station, and a third station (30), flanked to the second station.

Vertical walls originate from the work plane, for example a first wall (4), which delimits the external side of the first station, a second wall (6) interposed between the second (20) and third station (30), and lastly a third wall (7) which delimits the external side of the third station (30).

A first longitudinal bar (40) (direction X) is fixed to the first and second walls (4, 6) which slidably supports a first operating head (15), associated to the first station (10), and a second operating head (25), associated to the second station (20).

The above-mentioned operating heads (15, 25) are moved in direction X by respective drawing means not illustrated as known to the technical expert in the sector.

A second longitudinal bar (50) is fixed to the second wall (6) and third wall (7) (direction X) which slidably supports a third operating head (35): the bar (50) is moved in direction Y using methods not illustrated since they are known to the expert in the sector.

This head (35) too is moved in direction X by relative drawing means of known type, not indicated.

The portion of the work plane (5) relating to the first station (10) comprises two parallel guides (10A, 10B), according to direction Y (perpendicular to above-mentioned direction X); the guides, as will be evidenced in the following, are destined to receive the sliding means (3A, 3B) of a relative frame (1A, 1B, 1C).

Also the portion of the work plane (5) relative to the second station (20) comprises two parallel guides (20A, 20B), arranged according to direction Y, destined to receive the sliding means (3A, 3B) of a relative frame.

The front portion of the work plane (5) comprises a longitudinal guide (45), oriented according to direction X, which receives a translating bar (55) comprising pairs of means (65A-65B, 75A-75B) destined to couple with relative coupling means (4A, 4B) having a relative frame; the movement of the translating bar in direction X is done using techniques known to the expert in the sector.

With reference to the figures, (1A) indicates a first frame: the relative sliding means (3A, 3B) are inserted in the relative guides (10A, 10B).

The first station (10) comprises first means (of known type, not illustrated), controlled using known methods by a control unit, cooperating with the punching head (15) so as to realise, on the first portion (P1) hooked to the first frame (1A), punching (G1) mutually positioned in a predetermined way; the first means comprise means for moving the first frame (1A) according to direction Y, and means for driving the punching head (15) according to direction X.

Figure 2:
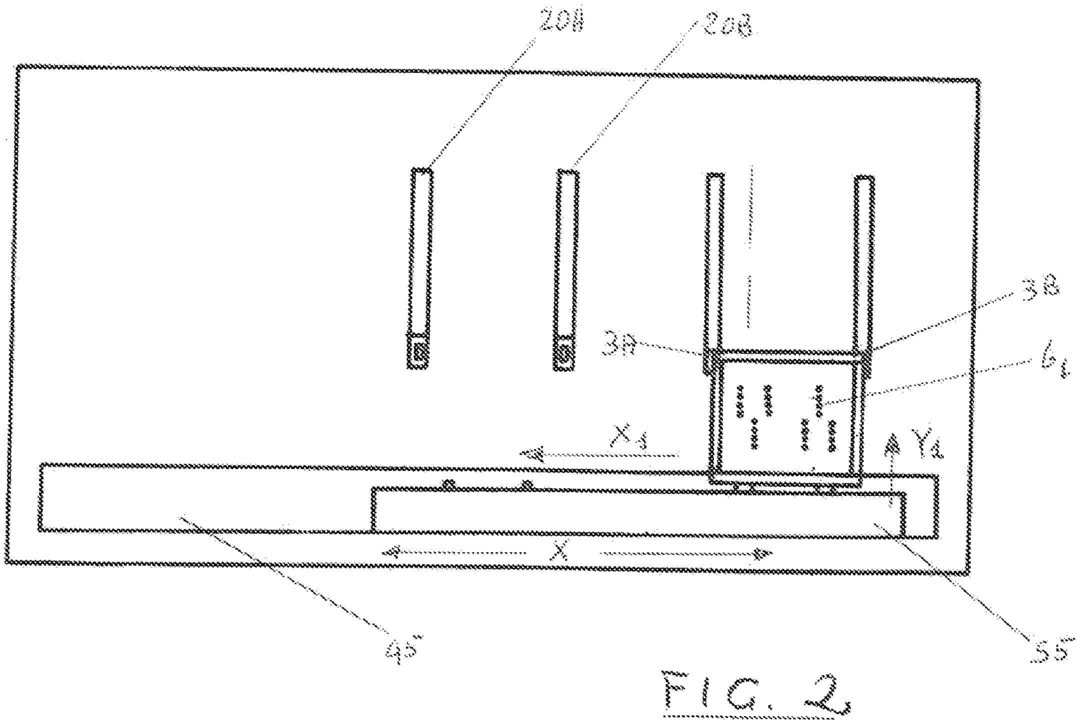

After completing the punching operation, the first frame (1A) is neared to the translating bar (55) in such a way as to face the relative coupling means (4A, 4B) with the corresponding coupling means (65A, 65B) of the bar (55); the translation of the bar (direction Y1) realises the coupling (FIG. 2).

Figure 3:
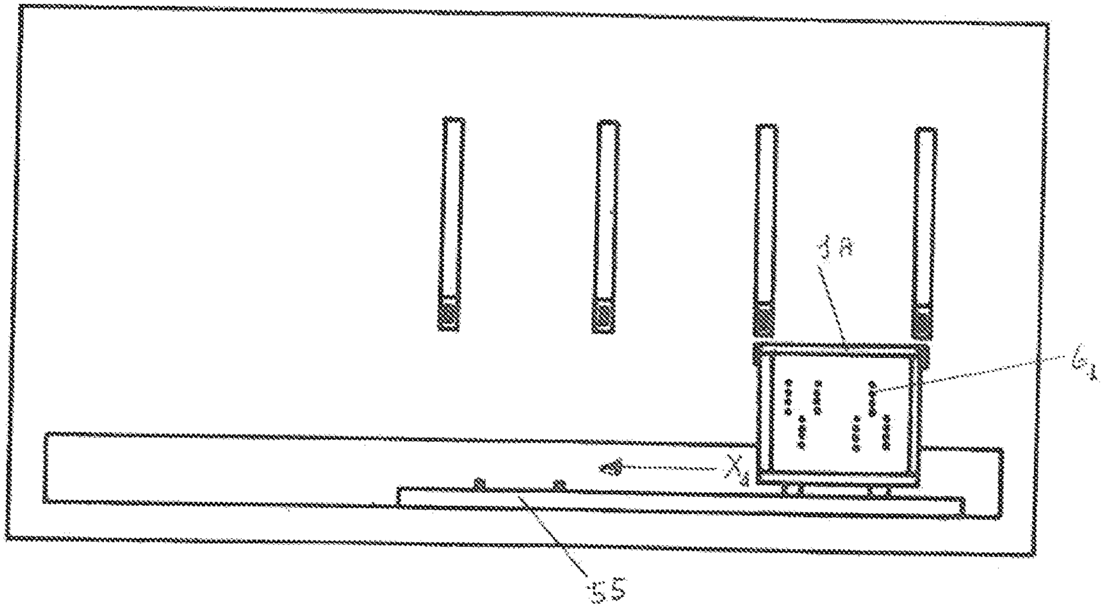

At this point, in phase relation with the release of the sliding means (3A, 3B) from the guides (10A, 10B) (FIG. 3) the bar (55) is translated in direction X1 until positioning the first frame (1A) into the second station (20), with the sliding means (3A, 3B) neared to the inner heads of the guides (20A, 20B). The translation of the translating bar (55) in direction Y1 involves the mutual engagement of the sliding means (3A, 3B) with the guides (20A, 20B) (FIG. 4); thereafter the bar (55) first disengages from the first frame (1A) (direction Y2) and successively translates in direction (X2), thus being repositioned in the starting position (FIG. 5).

Figure 4:
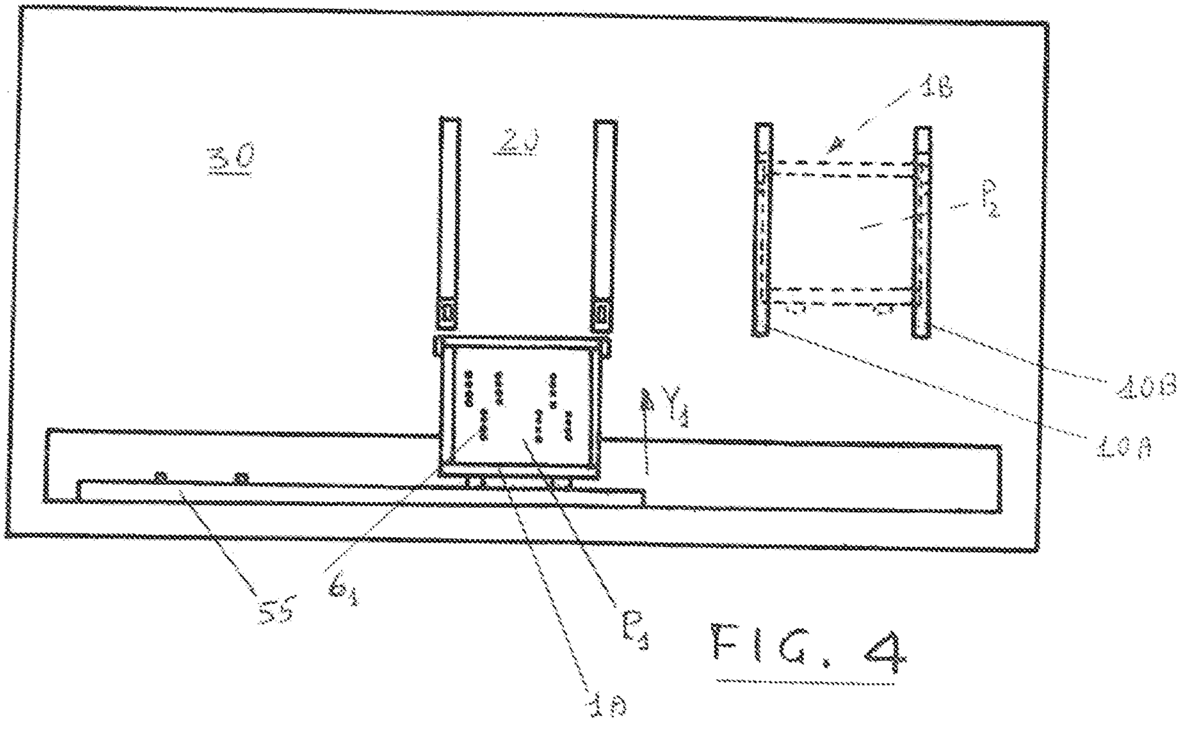

In phase relation with the foregoing, a second frame (1B), to which a second portion (P2) is removably hooked, is engaged with the guides (10A, 10B) of the first station (10) (see FIG. 4 in which the second frame (1B) is denoted in a broken line).

The second station (20) comprises second means (of known type, not illustrated, commanded by the control unit) cooperating with the stitching head (25) to realise, on the first portion (P1) hooked to the first frame (1A), stitching (G2) arranged in a predetermined way with respect to one another and with respect to the punching (G1); the second means comprise means for moving the first frame (1A) in direction Y, and means for driving the stitching head (25) according to direction X.

Figure 5:
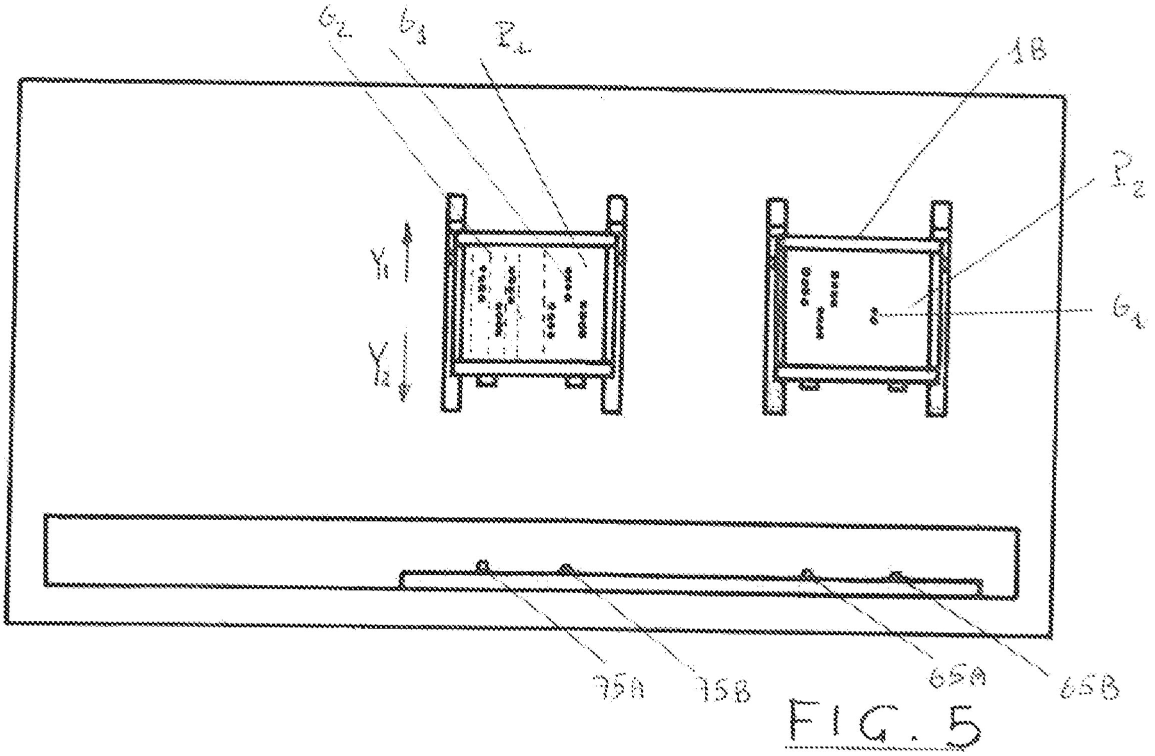

The punching (G1) is made on the second portion (P2) hooked to the second frame (1B) located in the first station (10) (FIG. 5).

Figure 6:
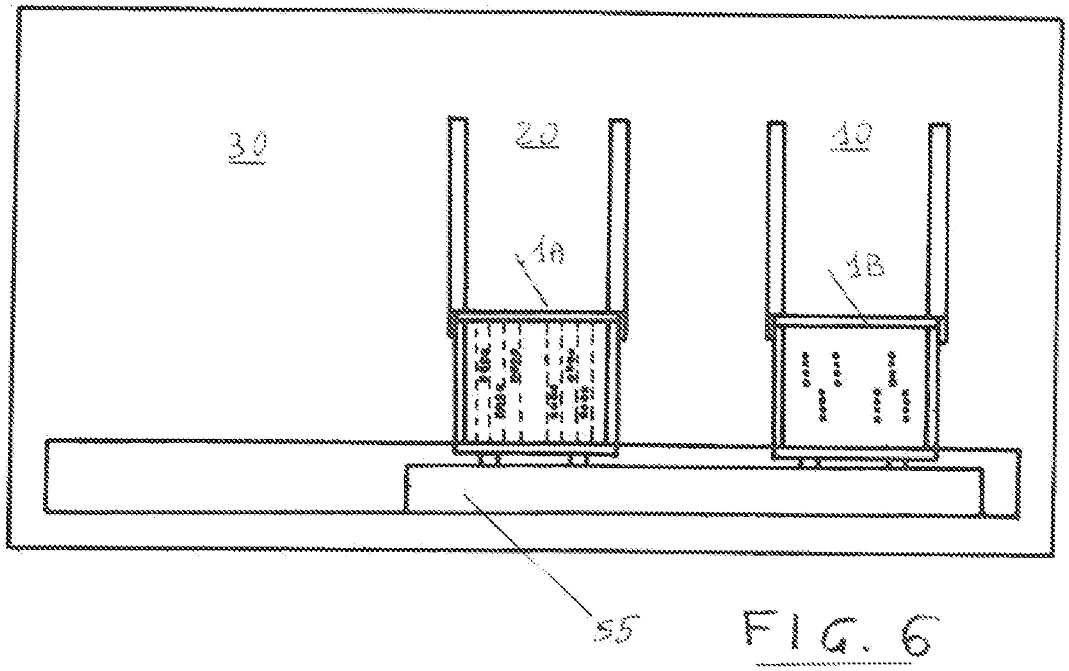

On completion of the stitching operations (second station 20) and punching operations (first station 10), the frames (1A, 1B) are translated in phase relation in direction Y2, and the bar (55) is driven in direction Y1: this brings about the mutual engagement of the coupling means (4A, 4B) of the first frame (1A) and second frame (1B) with the corresponding coupling means (75A, 75B-65A, 65B) of the bar (55) (see FIG. 6).

Figure 7:
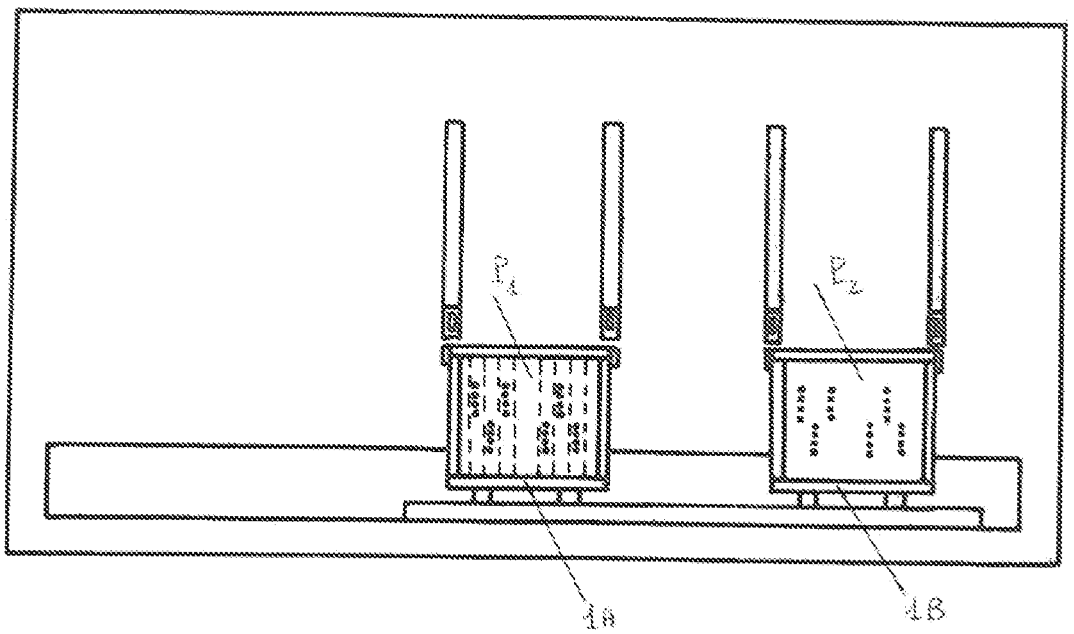
Figure 8:
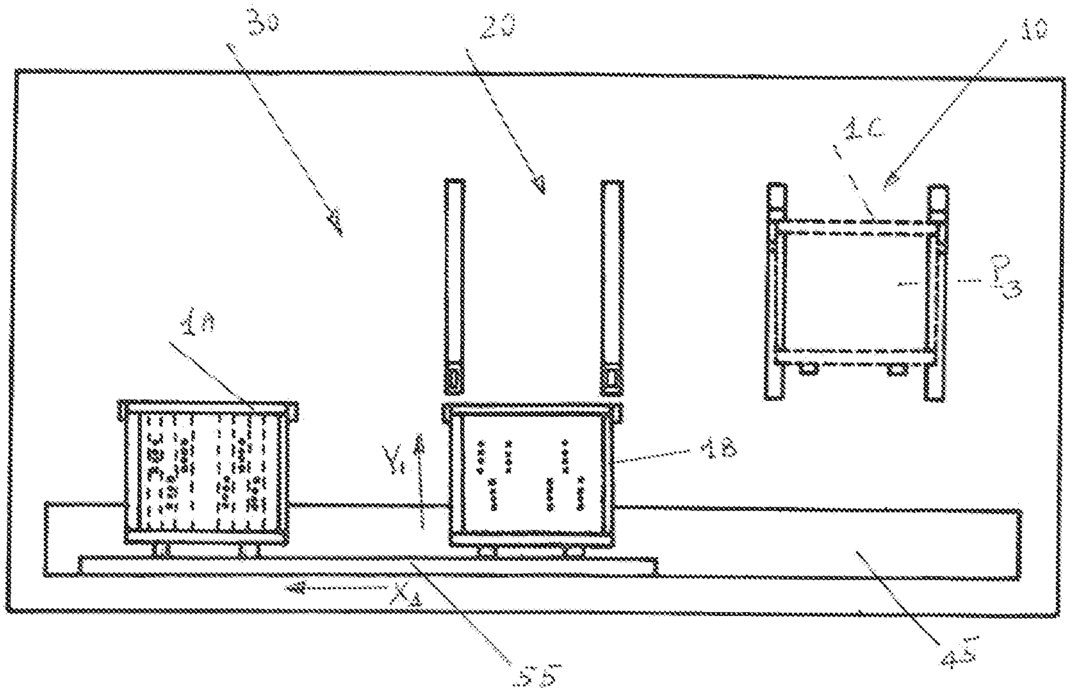

The translation of the bar (55) in direction Y2 leads to the release of the frames (1A, 1B) from the guides (20A-20B, 10A-10B) respectively of the first frame (1A) and second frame (1B) (FIG. 7); thereafter the bar (55) is translated in direction X1 until positioning the first frame (1A) in the initial part of the third station (30), and the second frame (1B) in the initial part of the second station (20) (see FIG. 8).

Figure 9:
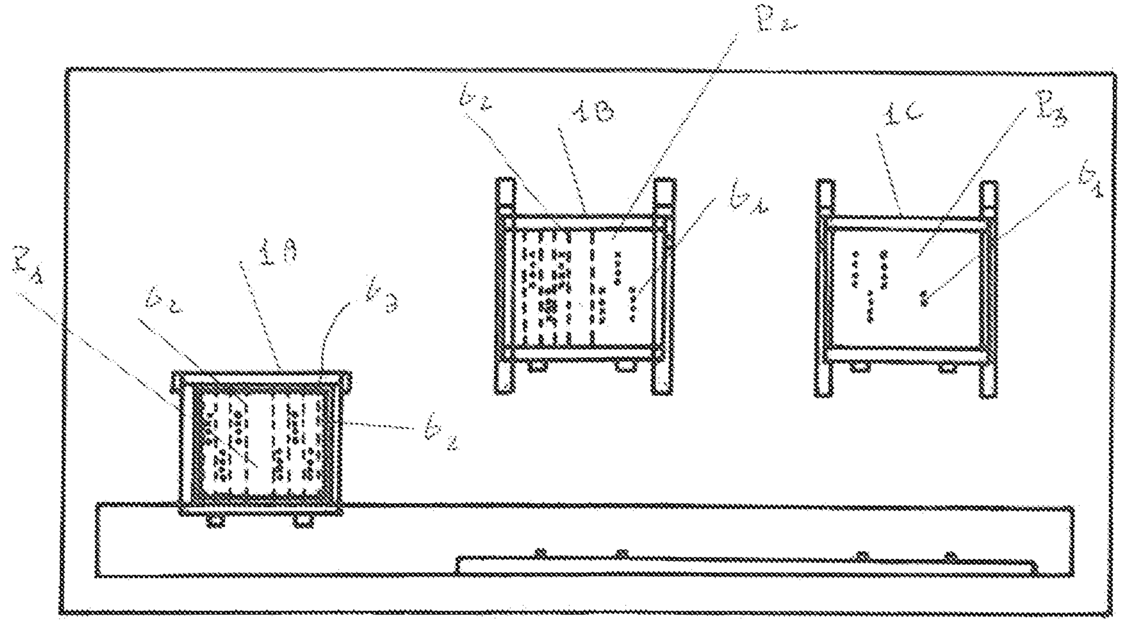

On the one hand the translation of the bar (55) in direction Y1 enables positioning the first frame (1A) in the third station (30) and engaging the second frame (1B) with the guides (20A, 20B) of the second station; and then the translation of the bar (55) in direction Y2 brings about the release of the bar from the relative first frame (1A) and second frame (1B) (FIG. 9).

In phase relation with the foregoing, a third frame (1C) (to which a relative third portion (P3) is hooked) is engaged with the guides (10A, 10B) of the first station (10) (see FIG. 8 in which the third frame (1C) is denoted in a broken line).

Figure 12A:
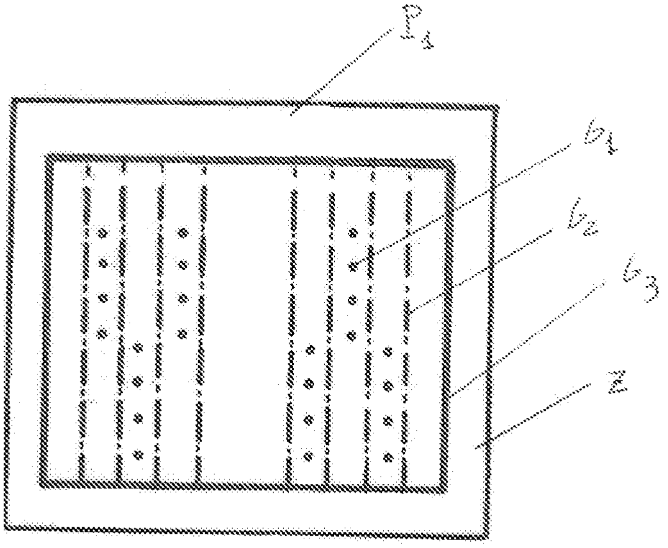
FIGS. 12A, 12B illustrate respectively, in plan view, the portion of material from which an article is made and the article itself.

The third station (30) comprises third means (of known type, not illustrated, commanded by the control unit) cooperating with a cutting head (35) so as to carry out, on the portion of material (P1) hooked to the first frame (1A), a cutting operation (G3), for example in a looped pathway inside which the punching (G1) and the stitching (G2) are comprised: in this way an article (A) is defined having a predetermined profile (see FIGS. 9, 12A).

The third means comprise means for translating the cutting head along a second bar (50) (direction X) and means for driving the cutting head along direction Y.

In phase relation with the cutting operation carried out on the first portion (P1) of the first frame (1A), in the second station (20) the stitching (G2) seams are made on the second portion (P2) hooked to the second frame (1B) and the punching (G1) is done on the third portion (P3) hooked to the third frame (1C) in the first station (FIG. 9).

Figure 10:
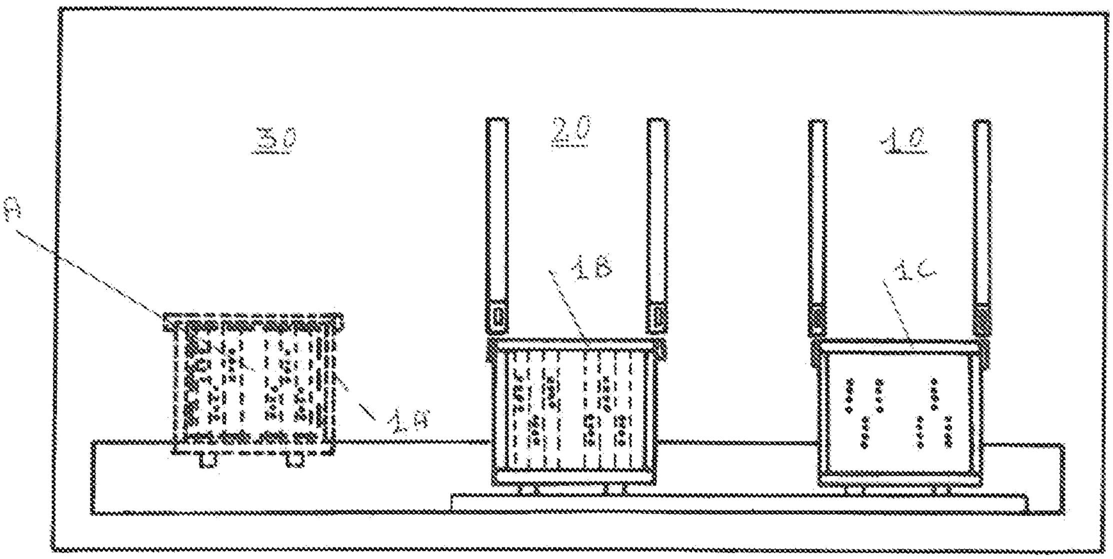
Figure 11:
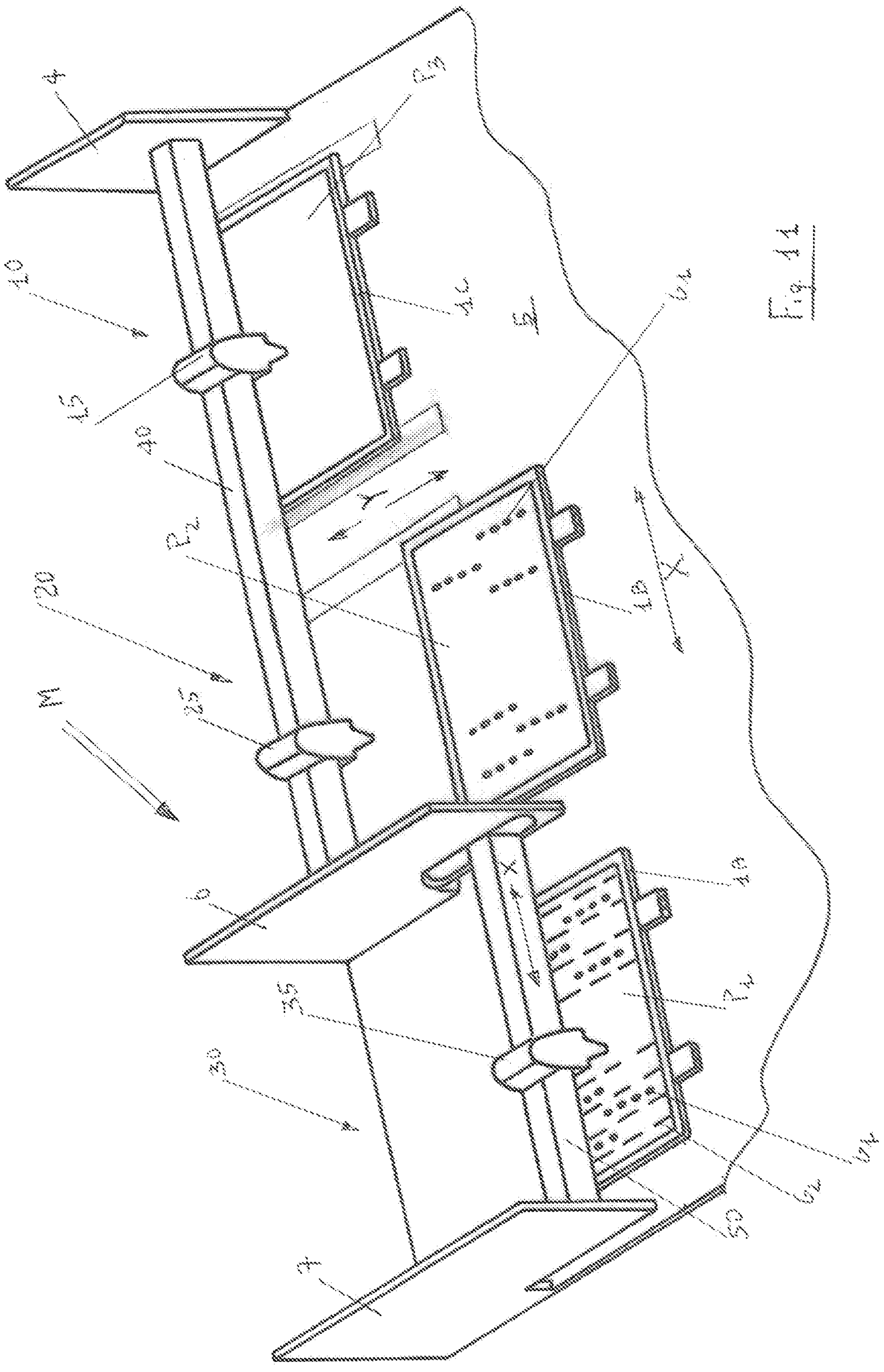
FIG. 11 is a schematic perspective view, with known parts not included, of the apparatus.

On completion of the above processing operations, the frame (1A) (with relative article (A)) and with the relative scrap (Z) is disengaged, in accordance with known systems (automatic or manual) from the third station (30), and the second frame (1B) and the third frame (1C), as described in the foregoing, are released from the relative guides (20A-20B, 10A-10B) hooked to the bar (55) in order to be transferred respectively into the third (30) and second station (20) so as to carry out, respectively and therein, the cutting operations and stitching operations (see FIG. 10); the first station (10) is loaded with a further frame to realise, on the portion hooked thereto, the punching operations.

Figure 12B:
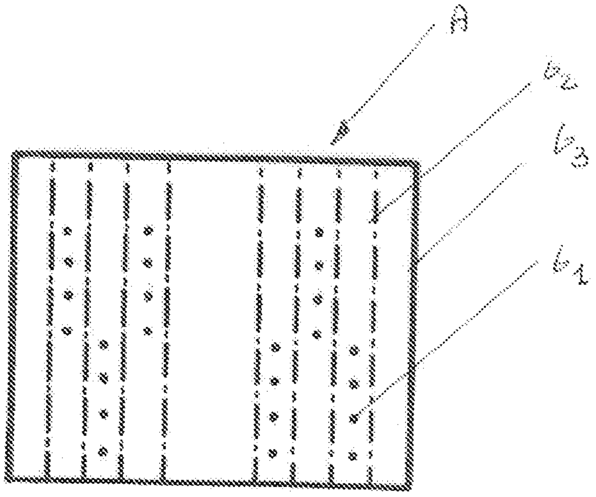

The detaching of the scrap (Z) generated by the cutting operation (G3) on the first portion (P1), from the article (A) (FIG. 12B) is done following known systems, not illustrated as not pertinent to the present invention.

Definitively, the operations of punching, stitching and cutting are carried out in the three stations of the apparatus (M).

The control unit intervenes to command the heads (15, 25, 35) so as to realise, in the first two, a predetermined aesthetic appearance, and in the last, an article (A) with an established area and profile.

Alternatively to the foregoing, the punching operations and stitching operations can be actuated, respectively, in the second (20) and first station (10) where the punching (15) and stitching (25) heads will be arranged.

The loading of a frame in the first station (10) can be carried out either with the aid of an operator, or automatically according to systems known to a technical expert in the sector.

Likewise the unloading of a frame (with the cutting operation completed) from the third station can be carried out either with the aid of an operator or automatically according to known systems.

With reference to the first station (10) consideration has been made of the movements of the frame according to direction Y, and of the punching head (15) according to direction X; it is possible to comprise, with the described first means, maintaining the frame fixed and moving the punching head (15) in both directions X, Y.

Like considerations are valid for the second station (20) in which the frame can be kept fixed and the stitching head (25) moved in directions X, Y.

In the described technical solution the means (4A, 4B) of each frame, which have been denoted generically, couple with the means (65A-65B, 75A-75B) of the translating bar (55); the means can comprise pliers-type gripping means, movable pins (activated using hydraulic, magnetic or other means), inserting in relative seats, or other means performing the same functions.

The bar (55) has been considered movable in directions X, Y; instead of direction Y the bar can be moved in the perpendicular direction to direction X and to the work plane (5).

Definitively, the described apparatus represents a possible technical solution with which to actuate the described method.

The method enables realising articles having a predetermined area and aesthetic appearance, which includes using frames (1A, 1B, 1C) to each of which a portion (P1, P2, P3) of material having a prevalent flat extension can be removably hooked, the method comprising, in order, following steps:

- hooking a first portion (P1) of the material to a first frame (1A);
- carrying out, on the first portion (P1) hooked to the first frame, punching (G1) and stitching (G2) operations;
- carrying out, on the first portion (P1) hooked to the first frame (1A), cutting operations (G3) for defining a corresponding article (A) having predetermined area and aesthetic appearance defined by the combination of the profile of the article and by the mutual arrangement of the punching (G1) and the stitching (G2);
- releasing the article (A), and relative scrap (Z), from the first frame (1A).

The punching (G1) or stitching (G2) operations are preferably realised in a first station (10);

- the stitching (G2) or punching (G1) operations, are realised in a second station (20);
- the cutting (G3) operations are realised in a third station (30).

Further, in phase relation with the realising of the stitching (G2) or punching (G1) operations, in the said first portion (P1) hooked to the first frame (1A) situated in the second station (20), the punching (G1) or stitching (G2) operations are realised on a second portion (P2) hooked to a second frame (1B) situated in the first station (10). Again, in phase relation with the carrying out of the cutting operations (G3) on the first portion (P1) hooked to the first frame (1A) situated in the third station (30), the stitching operations (G2) or the punching operations (G1) are also realised on the second portion (P2) hooked to the second frame (1B) situated in the second station (20), the punching (G1) or stitching (G2) operations are realised on a third portion (P3) hooked to a third frame (1C) situated in the first station (10).

The method of the invention satisfies the aim set in the preamble.

In fact, the punching, stitching and cutting operations, are realised on the portion (P1, P2, P3) of material, using the same references, i.e. the frame (1A, 1B, 1C) to which the portion is hooked; this eliminates, therefore, the dead times existing in the prior art. Further, the punching, stitching and cutting operations are realised in succession, by means of the apparatus.

In the three stations, and at the same time, the above-described processing operations are respectively carried out on three frames, using the relative punching (15), stitching (25) and cutting (35) heads which operate using the same references: in fact the transfer of a frame from the first to the second station, and the transfer, in suitable phase relation, of another frame from the second to the third station, requires no "centring" operation of the single frame with respect to the references of the station in which it is located.

The apparatus of the invention has a positive effect on productivity and furthermore is structured in such a way as to allow, when required, automation of the steps of loading the frame in the first station (10), and unloading the frame (when the cutting operation is completed) from the third station.

It is understood that the above has been described by way of example and that technical-functional variants of the apparatus are considered to fall within the protective scope of the invention as claimed in the following.

The invention claimed is:

1. A method for realizing articles having a predetermined area and aesthetic appearance, comprising, in order, the following steps:

- providing material having a plurality of portions each having a flat extension;
- hooking, via a respective first flat extension, a first portion of the of the plurality of portions to a first frame of a plurality of frames;
- carrying out, on the first portion hooked to the first frame, punching and stitching operations in a first station;
- carrying out, on the first portion hooked to the first frame, stitching or punching operations in a second station;
- carrying out, on the first portion hooked to the first frame, cutting operations in a third station, to define one of the articles having the predetermined area and aesthetic appearance defined by a combination of a profile of the articles and by a mutual arrangement of the punching and the stitching; and
- releasing the one of the articles, and scrap produced in the cutting operations, from the first frame;
- wherein in phase relation with the stitching or punching operations carried out on the first portion in the second station, punching or stitching operations are performed on a second portion of the plurality of portions hooked via a respective second flat extension to a second frame situated in the first station; and wherein in phase relation with the cutting operations carried out on the first portion in the third station, stitching or punching operations are performed on the second portion hooked to the second frame and situated in the second station, and punching or stitching operations are carried out on a third portion of the plurality of portions hooked via a respective third flat extension to a third frame and situated in the first station.

* * * * *